(12) United States Patent
Zubairy et al.

(10) Patent No.: US 8,891,767 B2
(45) Date of Patent: Nov. 18, 2014

(54) METHOD AND APPARATUS FOR DIRECT COUNTERFACTUAL QUANTUM COMMUNICATION

(71) Applicants: The Texas A&M University System, College Station, TX (US); King Abdulaziz City for Science and Technology, Riyadh (SA)

(72) Inventors: Muhammad Suhail Zubairy, College Station, TX (US); Zhenghong Li, College Station, TX (US); Mohammad D. Al-Amri, Riyadh (SA); Hatim A. Salih, Riyadh (SA)

(73) Assignee: Texas A&M University System, College Station, TX (US)

( * ) Notice: Subject to any disclaimer, the term of this patent is extended or adjusted under 35 U.S.C. 154(b) by 0 days.

(21) Appl. No.: 13/723,517

(22) Filed: Dec. 21, 2012

(65) Prior Publication Data

US 2014/0177837 A1 Jun. 26, 2014

(51) Int. Cl.
- *H04L 9/08* (2006.01)
- *H04B 10/70* (2013.01)
- *H04B 10/00* (2013.01)
- *H04K 1/00* (2006.01)

(52) U.S. Cl.
CPC .............. *H04L 9/0852* (2013.01); *H04B 10/30* (2013.01); *H04B 10/70* (2013.01); *H04L 9/0883* (2013.01)
USPC ........................................................ 380/256

(58) Field of Classification Search
CPC ....... H04L 9/0883; H04B 10/70; H04B 10/30
USPC ........................................................ 380/256
See application file for complete search history.

(56) References Cited

U.S. PATENT DOCUMENTS

| | | | |
|---|---|---|---|
| 7,180,645 B2 * | 2/2007 | Azuma | 359/107 |
| 8,149,494 B1 * | 4/2012 | Spence | 359/288 |

OTHER PUBLICATIONS

Hosten et al. "Counterfactual quantum comptation through quantum interrogation" Nature vol. 439, Feb. 2006.*
Liu et al. "Experimental demonstration of counterfactual quantum communication" American Physical Society, Physicalo Review Letters, Jul. 2012.*
Kwiat et al. "Quantum seeing in the dark" Scientific American Nov. 1996.*
Huang et al. "Interaction and measurement-free quantum Zeno gates for universal computation with single-atom and single-photon qubits" The American Physical Society, Physical Review Letters, Jun. 2008.*

(Continued)

*Primary Examiner* — Christopher Revak
*Assistant Examiner* — Jason C Chiang
(74) *Attorney, Agent, or Firm* — Wong, Cabello, Lutsch, Rutherford & Brucculeri LLP

(57) ABSTRACT

It has long been assumed in physics that for information to travel in empty space between two parties (the Sender and the Receiver), "physically real" entities have to travel between the parties. The recently discovered technique of interaction-free measurement—wherein the presence of an object is inferred without the object directly interacting with the interrogating light—has caused this basic assumption to be questioned. This technique has found application in quantum key distribution in the form of counterfactual quantum key distribution—albeit with limited efficiency. In the present invention, using the "chained" quantum Zeno effect, this logic is taken to its natural conclusion and, in the ideal limit, information can be transferred between the Sender and the Receiver without any physical particles whatsoever traveling between them.

8 Claims, 4 Drawing Sheets

(56) References Cited

OTHER PUBLICATIONS

Ren et al. "Experimental demonstration of counterfactual quantum key distribution" Laser Physics, vol. 21, No. 4, 2011, pp. 755-760.*

Kwiat et al. "Interaction-free measurement" The American Physical Society, Physical Review Letters, vol. 74, No. 24, Jun. 1995.*

Noh "Counterfactual-quantum cryptography" The American Physical Society, Physical Review Letters, Dec. 2009.*

Avella et al. Report of proof-of-principle implementations of novel QKD schemes performed at INRIM. Poce. Of SPIE vol. 8542, 85421N, 2012.*

Ekert, Artur K., "Quantum Cryptography Based on Bell's Theorem," The American Physical Society, Physical Review Letters, vol. 67, No. 6, Aug. 5, 1991, pp. 661-663.

Elitzur, Avshalom C. et al., "Quantum Mechanical Interaction-Free Measurements," Foundations of Physics, vol. 23, No. 7, Jan. 2, 1993, pp. 987-997.

Gerhardt, Ilja et al., "Full-field implementation of a perfect eavesdropper on a quantum cryptography system," Nature Communications, 2:349, DOI: 10.1038/ncomms1348, www.nature.com/naturecommunications, Jun. 14, 2011, 6 pages.

Kwiat, P. G. et al, "High-Efficiency Quantum Interrogation Measurements via the Quantum Zeno Effect," The American Physical Society, Physical Review Letters, vol. 83, No. 23, Dec. 6, 1999, pp. 4725-4728.

Lydersen, Lars et al., "Hacking commercial quantum cryptography systems by tailored bright illumination," Nature Photonics, Letters, vol. 4, Aug. 29, 2010, pp. 686-689.

Noh, Tae-Gon, "Counterfactual Quantum Cryptography," The American Physical Society, Physical Review Letters, vol. 103, 230501, Dec. 4, 2009, 4 pages.

Ren M. et al., "Experimental Demonstration of Counterfactual Quantum Key Distribution," Laser Physics, vol. 21, No. 4, Mar. 4, 2011, pp. 755-760.

Wiesner, Stephen, "Conjugate Coding," Department of Physics, Columbia University, New York, 1983, 11 pages.

Wootters, W. K. et al., "A single quantum cannot be cloned," Nature Publishing Group, Letters to Nature, vol. 299, Oct. 28, 1982, pp. 802-803.

\* cited by examiner

METHOD AND APPARATUS FOR DIRECT COUNTERFACTUAL QUANTUM COMMUNICATION

CROSS-REFERENCE TO RELATED APPLICATIONS

None

STATEMENT REGARDING FEDERALLY SPONSORED RESEARCH OR DEVELOPMENT

Not Applicable

BACKGROUND OF THE INVENTION

1. Field of the Invention

This invention relates to communications systems. More particularly, it relates to the encrypted communication of information.

2. Description of the Related Art including Information Disclosed Under 37 CFR 1.97 and 1.98

Although quantum mechanics has been an immensely successful theory since its inception about a century ago, its conceptual foundation is often a matter of intense debate. Furthermore, several novel phenomena are predicted and observed based on quantum mechanics that appear counter-intuitive and are unexplainable in the classical domain. Whole new fields owe their existence to this body of knowledge. One such field is quantum communication. In the present invention, a new mode of communication is used whereby no physical particles travel between sender and receiver.

In 1970, the idea of "quantum money" [S. Wiesner, SIGACT News 15, 78 (1983)]—money that cannot be forged—came to light, effectively kick-starting the field of quantum information. The idea, perhaps too advanced for its time, rested on the conjecture that quantum states cannot be faithfully copied, was later proved as the no-cloning theorem [see, e.g., W. K. Wootters and W. H. Zurek, Nature 299, 802 (1982)]. Moreover, the mere act of measurement of an unknown quantum state alters it irreversibly. While "quantum money" has not turned out to be practical, the basic concept found direct application in cryptography [see, e.g., S. Singh, *The Code Book: The Science of Secrecy from Ancient Egypt to Quantum Cryptography* (Fourth Estate, London 1999)], or more precisely in quantum key distribution (QKD) [see, e.g., C. H. Bennett, and G. Brassard, in Proceedings of the IEEE International Conference on Computers, Systems and Signal Processing, Bangalore, India, (IEEE, New York), 175 (1984)], promising unconditionally secure communication.

The two most celebrated quantum key distribution (QKD) protocols, the BB84 [see, e.g., C. H. Bennett and G. Brassard, 1985, IBM Tech. Discil Bull. 28, 3153 (1985).] and E-91 [see, e.g., A. K. Ekert, Phys. Rev. Lett. 67, 661 (1991)] both utilize basic ingredients from "quantum money" including that of a qubit and the use of non-orthogonal quantum states to encode information. While the security of the BB84 and E-91, as well as a host of other QKD protocols, are guaranteed by the laws of physics, imperfect practical implementation can lead to serious loopholes, leaving them vulnerable to attack [L. Lydersen, C. Wiechers, C. Wittmann, D. Elser, J. Skaar and V. Makarov, Nature Photon. 4, 686-689 (2010)]. For example, Gerhardt et al. [I. Gerhardt, Q. Liu, A. Lamas-Linares, J. Skaar, C. Kurtsiefer and V. Makarov, Nature Comm 2, 349 (2011)] have demonstrated in a laboratory setting, using an intercept-resend strategy, how to successfully obtain the secret random key shared by two legitimate parties, Sender and Receiver, in two commercially available QKD systems, without leaving a trace.

Such potentially devastating attacks provide strong motivation for new approaches in QKD including, but not limited to counterfactual QKD, first proposed by Noh [T.-G. Noh, Phys. Rev. Lett. 103, 230501 (2009)]. Although the Noh09 protocol was not the first to make use of interaction-free measurements in QKD, it was the first to employ counterfactuality, meaning that no information-carrying qubits travel between the Sender and the Receiver. The Noh09 protocol has been realized experimentally [see, e.g., M. Ren, G. Wu, E. Wu, and H. Zeng, Laser Phys. 21, 755 (2011)]. The drawback of this protocol is that, even in the ideal case only 12.5% of the photons used are retained, the rest are discarded.

The basic idea of interaction-free measurement [see, e.g., A. C. Elitzur, and L. Vaidman, Found. Phys. 23, 987 (1993)] (or quantum interrogation), central to both counterfactual cryptography and counterfactual computation [see, e.g., R. Jozsa, in *Lecture Notes in Computer Science*, edited by C. P. Williams (Springer-Verlag, Berlin), 1509, 103 (1999)], makes use of the fact that the presence of an obstructing object, acting as a measuring device, inside an interferometer setting, destroys interference even if no particle is absorbed by the object. This has the surprising consequence that sometimes the presence of such an object can be inferred without the object directly interacting with any (interrogating) particles.

This effect may be demonstrated using a setup such as the one illustrated in FIG. 1.

When a photon's state is non-deterministically altered, such as interacting with a half-silvered mirror where it non-deterministically passes through or is reflected, the photon undergoes quantum superposition, whereby it takes on all possible states and can interact with itself. This phenomenon continues until an "observer" (detector) interacts with it, causing the wave function to collapse and returning the photon to a deterministic state.

After being emitted, the photon "probability wave" will both pass through half-silvered mirror BS1 (take the route to the right in FIG. 1) and be reflected (take the left route). If the observer is not present, the photon will not be absorbed, and so the wave continues along the right route to the second half silvered mirror BS2 (where it will encounter the left wave and cause self-interference).

The system reduces to the basic Mach-Zehnder apparatus with no observer present, in which case constructive interference occurs along the path exiting towards detector D2 in FIG. 1 and destructive interference occurs along the path exiting towards detector D1. Therefore, the detector D2 will detect a photon, and the detector D1 will not.

If the observer is present, upon meeting the observer the wave function collapses and the photon must either be on the left route or on the right route, but not both.

If the photon is measured on the route on the right in FIG. 1, because the observer is present, the photon is absorbed. If the photon is measured on the left route, it will not encounter the observer but since the right route cannot have been taken, there will be no interference effect at BS2. The photon on the left route now both passes through BS2 and is reflected. Upon meeting further observers (detectors D1 and D2), the wave function collapses again and the photon must be either at detector D1 or at detector D2, but not both. Thus it can be stated that if any photons are detected at detector D1, there must have been a detector at the observer position.

One might suppose that the presence or absence of an observer could be used to encode information—e.g., the presence of an "observer" could represent a logical 1 and the absence a logical 0. However, the yield rate of such a system is too low to make this practical. The present invention solves this problem.

In the present invention, the logic of counterfactual cryptography is taken to its natural conclusion. Using the quantum Zeno effect [see, e.g., P. G. Kwiat, A. G. White, J. R. Mitchell, O. Nairz, G. Weihs, H. Weinfurter, and A. Zeilinger, Phys. Rev. Lett. 83, 4725 (1999)] (which refers to the fact that repeated measurement of an evolving quantum system can inhibit its evolution, leaving it in its initial state, an effect often paraphrased as "a watched kettle never boils"), the efficiency of such interaction-free measurements can be dramatically boosted. In the ideal limit, information may be directly exchanged between a Sender and a Receiver with no physical particles traveling between them, thus achieving direct counterfactual communication.

BRIEF SUMMARY OF THE INVENTION

It has long been assumed in physics that for information to travel in empty space between two parties (the Sender and the Receiver), "physically real" entities have to travel between the parties. The recently discovered technique of interaction-free measurement wherein the presence of an object is inferred without the object directly interacting with the interrogating light—has caused this basic assumption to be questioned. This technique has found application in quantum key distribution in the form of counterfactual quantum key distribution—albeit with limited efficiency. In the present invention, using the "chained" quantum Zeno effect, this logic is taken to its natural conclusion and, in the ideal limit, information can be transferred between a Sender and a Receiver without any physical particles whatsoever traveling between them.

Referring now to FIG. 2 wherein S is the light source, C is the optical circulator, $D_1$ and $D_2$ and $D_3$ and $D_4$ are photon detectors, PBS stands for a polarizing beam-splitter that only reflects vertically polarized photons (V), SPR stands for switchable polarization rotator, PC stands for Pockels cell which determines the polarization state of the transmitted photons, SM stands for switchable mirror, MR stands for a normal mirror and OD stands for optical delay, it should be noted that only horizontally polarized photons (H) will be sent into the tandem Michelson interferometers. The two optical paths $SM_1 \rightarrow MR_1$ and $SM_1 \rightarrow MR_B$ for the first Michelson interferometer correspond to the outer cycle of the chained quantum Zeno effect CQZE (M cycles) for the Mach-Zehnder setup (see FIG. 3), while the paths $SM_2 \rightarrow MR_2$ and $SM_2 \rightarrow MR_B$ for the second Michelson interferometer, correspond to the inner cycle of the CQZE (N cycles). The mirror $SM_{1(2)}$ may be switched off initially to allow the photon to be transmitted but it may then remain on for M(N) cycles, and may be turned off again after M(N) cycles are completed. Here, $SPR_{1(2)}$ may rotate the polarization by a small angle $\beta_{M(N)} = \pi 4M(N)$ (for each cycle, the photon passes SPR twice), i.e., $|H\rangle$ evolves to $\cos \beta_{M(N)}|H\rangle + \sin \beta_{M(N)}|V\rangle$ and $|V\rangle$ evolves to $\cos \beta_{M(N)}|V\rangle - \sin \beta_{M(N)}|H\rangle$. $OD_1$ and $OD_2$ guarantee that optical distances of different paths of same interferometer exactly match. At the Message Sender's end, the Sender ("Bob") may pass an H photon by turning off his PC reflecting it back, and he may block an H photon by turning on his PC, changing the photon's polarization to V. An optical gate controlled by the Message Receiver ("Alice") through a classical channel and an $OD_B$ in the quantum channel may also be added. The time delay device may be used to protect the Sender's ("Bob's") bit choices from an Eavesdropper ("Eve"). It will be appreciated by those skilled in the art that the chance of the Receiver's ("Alice's") photon leaking into the quantum channel is almost zero for large enough M and N.

BRIEF DESCRIPTION OF THE SEVERAL VIEWS OF THE DRAWING(S)

DETAILED DESCRIPTION OF THE INVENTION

Figure 1:
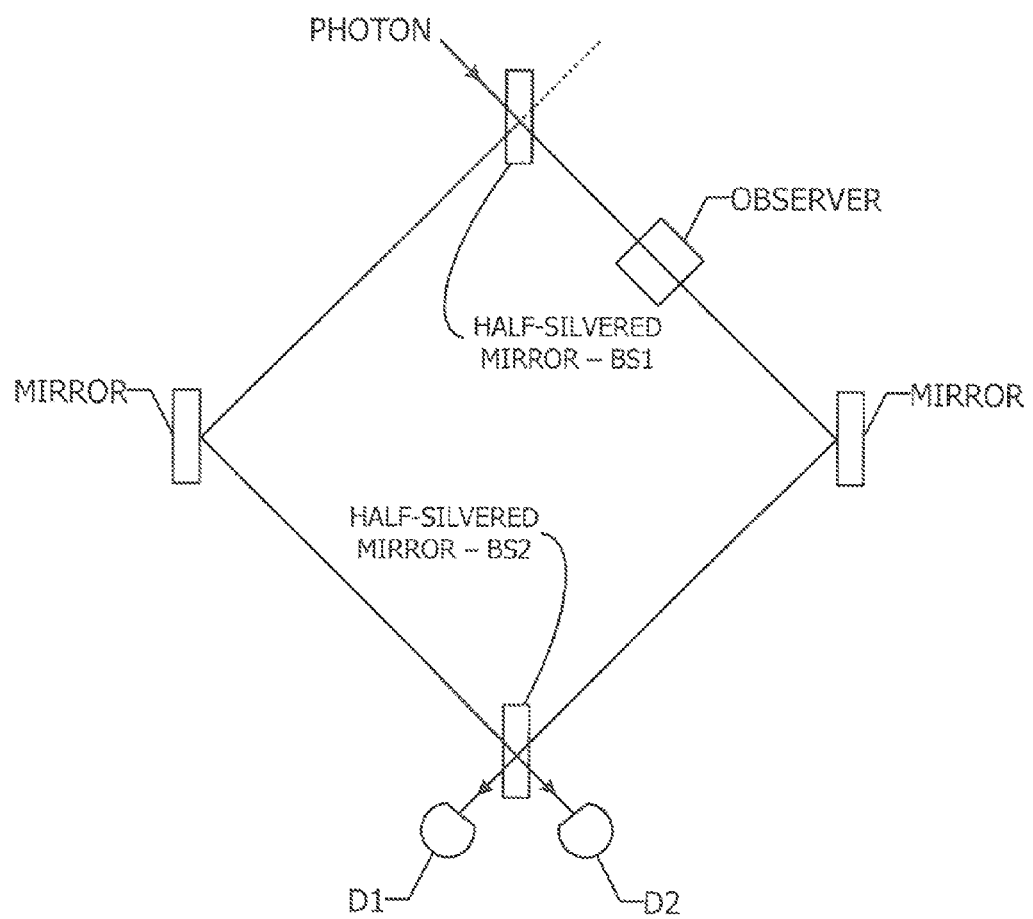
FIG. 1 is a diagram of an experiment of the prior art wherein a photon may be observed on one particular path of a Mach-Zehnder interferometer.
Figure 2:
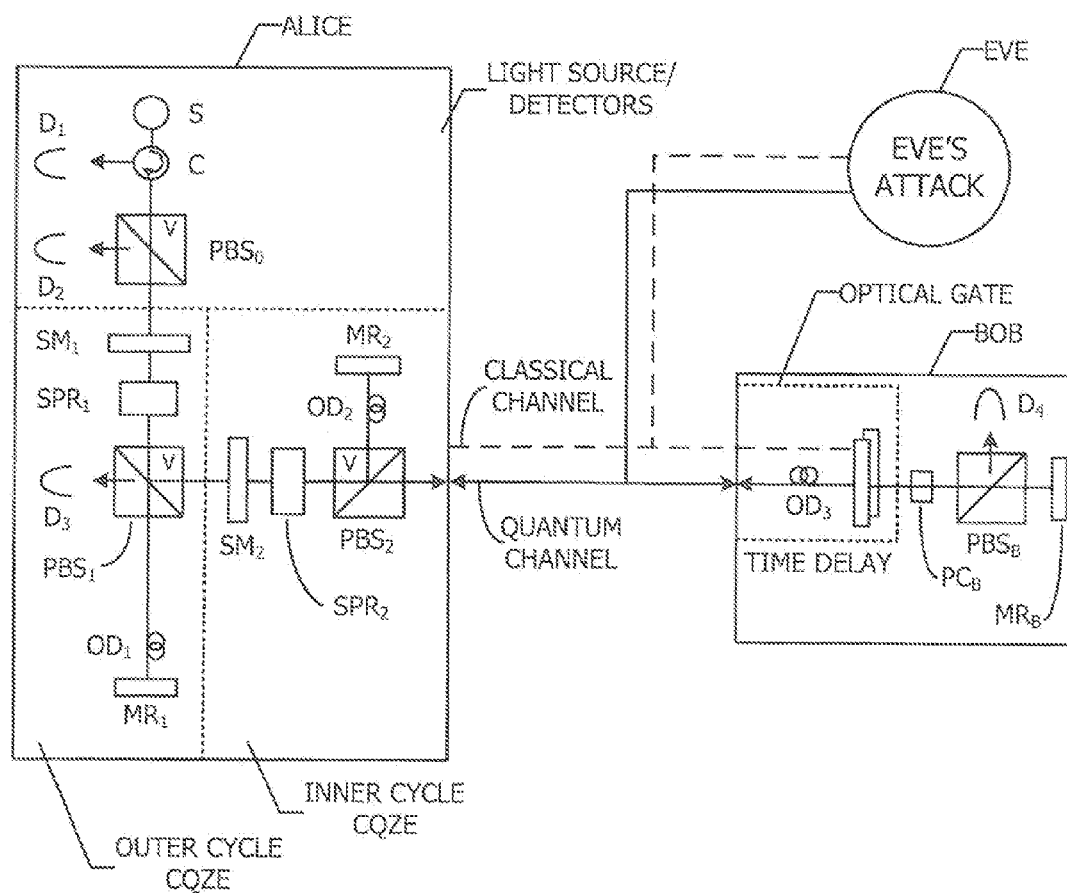
FIG. 2 is schematic representation of a communication system according to one embodiment of the invention.

One embodiment of the invention is shown diagrammatically in FIG. 2. At the Receiver's end ("Alice"), it is composed of two parts. The first part consists of a light source S that sends a stream of horizontally polarized (H) photons, detectors ($D_1$, $D_2$ and $D_3$), and a polarizing beam-splitter $PBS_0$ which only reflects vertically polarized photons V (as do all the PBS in the figure). The second part comprises two tandem Michelson interferometers. It includes two PBSs, two switchable polarization rotators (SPRs), two switchable mirrors (SMs) that can be switched on and off by external means, and two normal mirrors (MRs). This part of the setup allows the signal photon to have a very large probability of staying at the Receiver's end. On the other side, the Message Sender's setup ("Bob") also includes two parts. In the first part, the Sender, with the help of Pockel cell $PC_B$, can either switch the polarization of the incoming H photon to a V photon or keep the polarization state H unchanged. The $PBS_B$ reflects V photons to a detector $D_4$ (effectively blocking the communication channel) and allows H photons to be reflected back by the mirror $MR_B$. The second part is a time delay system whose purpose is to defend the Sender against an attack from an Eavesdropper ("Eve"). The Sender can send a stream of logic 0's and 1's by either keeping the polarization state H unchanged (logic 0) or switching it to polarization state V (logic 1). The Sender's choice of logic 0 and 1 leads to a click at detectors $D_1$ and $D_2$, respectively with almost unit probability and with almost no photon in the public channel, thus leading to direct counterfactual communication.

Figure 3:
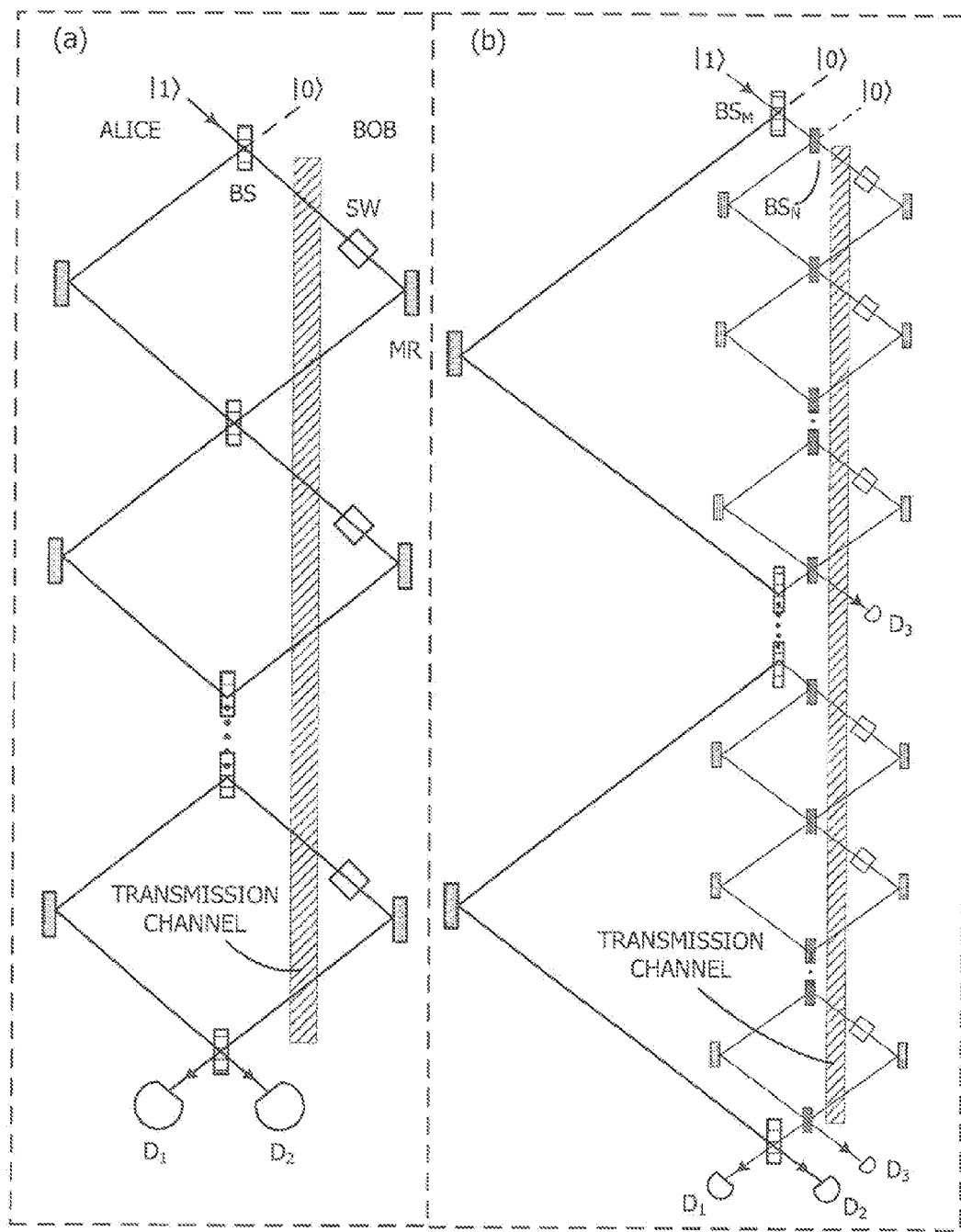
FIG. 3 is a schematic representation of a Mach-Zehnder setup that illustrates the working principle of the invention.

This setup may be implemented using current technology. However, before explaining how the setup works, it is useful to discuss an equivalent Mach-Zehnder type setup shown in FIG. 3 which helps to understand the working principle of the invention. In the Mach-Zehnder setup illustrated in FIG. 3, BS stands for beam-splitter and SW stands for ideal switches. In the transmission channel, the photon is accessible to the Eavesdropper. As shown in the portion of FIG. 3 indicated as (b), by using a chained version of the setup shown in portion (a), direct counterfactual quantum communication can be achieved. There are two kinds of beam splitters BSs, which have large reflectivity. One is $BS_M$, for M big cycles. The other is $BS_N$ for N small cycles within each M cycle. There are a total of M×N cycles for one signal. As discussed below, the probability of finding a signal photon in the transmission channel is nearly zero. Clicks at $D_1$ or $D_2$ reveal to the Receiver ("Alice") the Sender's ("Bob's") bit choices.

Initially a photon is sent by the Receiver from the left such that the input state (before the top beam-splitter) is $|H\rangle$. The state transformation at the beam-splitters may be described by $$|10\rangle \rightarrow \cos\theta|10\rangle + \sin\theta|01\rangle, |01\rangle \rightarrow \cos\theta|01\rangle - \sin\theta|10\rangle \quad (1)$$

where $\cos\theta = \sqrt{R}$ with R being the reflectivity of the BS.

At the Sender's end, ideal switches (SW) allow the Sender to pass the photon (logic 0) or to block it (logic 1).

There are two steps to achieve the direct counterfactual communication. One basic idea is utilizing the quantum Zeno effect, which refers to the fact that repeated measurement of a gradually evolving quantum state leaves it unchanged.

In the first step [see FIG. 3($a$)], a large number (N) of beam-splitters with a very small transmissivity, i.e., $\theta = \pi/2N$ are used. When the Sender allows the Receiver's photon to pass, by switching off all SWs at his end, the initial state $|10\rangle$ evolves coherently. After n cycles, the state of the photon can be written as $$|10\rangle \rightarrow \cos n\theta|10\rangle + \sin n\theta|01\rangle \quad (2)$$

Thus, at the end of N cycles (n=N), the final state is $|01\rangle$ and the detector $D_2$ clicks. On the other hand, if the Sender blocks the photon by switching on all SWs, the photonic state after n cycles is $$|10\rangle \rightarrow \cos^{n-1}\theta(\cos\theta|10\rangle + \sin\theta|01\rangle) \approx |10\rangle \quad (3)$$

where N is assumed to be large and $\cos^N \theta \approx 1$. Here the square of the overall factor $\cos^{2(n-1)}\theta$ represents the probability of having the state $|10\rangle$ after n−1 cycles. In this case the detector $D_1$ clicks.

As a result, the Sender's blocking causes detector $D_1$ to click, while passing the photon causes detector $D_2$ to click. This means that, in the ideal limit, the Receiver can read the Sender's bit choices with arbitrarily large efficiency. This is the first step towards direct counterfactual quantum communication.

Although the Mach-Zehnder set-up, shown in FIG. 3($a$), enables direct communication, the protocol is not counterfactual. In the case when the Sender does not block, the photon's final state $|01\rangle$ implies the photon passing through the transmission channel with unit probability at Nth cycle, where the risk that the Receiver's signal photon is stolen becomes very high. The protocol is also not counterfactual as the photon travels through the public channel in the case where the Sender does not block the photon.

The present invention uses a protocol that leads not only to direct communication between the Sender and the Receiver but is also counterfactual. A chained version of the quantum Zeno effect (CQZE) is used, as shown in FIG. 3($b$). The signal photon passes through "M" big cycles separated by $BS_M$s with $\theta_M = \pi/3M$. For the m-th cycle (m≤M), there are "N" beam-splitters $BS_N$s with $\theta_N = \pi/2N$.

As a result of beam-splitter transformations, now, there exist three photon states $|i,j,k\rangle$; where $|i\rangle$, $|j\rangle$ and $|k\rangle$ correspond to the photon states at the left hand-side arms of the outer chain, at the left hand-side arms of the inner chain, and at the right hand-side arms of the inner chain, respectively.

By using the results shown in Equations (2) and (3), it is easy to see that if the Sender passes the Receiver's photon, for the m-th big cycle, one would have, $$|010\rangle \rightarrow \cos n\theta_N|010\rangle + \sin n\theta_N|001\rangle \stackrel{n=N}{\rightarrow} |001\rangle \quad (4)$$

It may be assumed that initially the Receiver sends a single photon as shown in FIG. 3($b$) where all unused ports are in the vacuum state. The initial state of the total system is $|110\rangle$. We can see the evolution by including results from Equations (2) and (3).

First, consider the case when the Sender ("Bob") does not block at any stage (logic 0). After the m-th cycle, the resulting photon state is $$|100\rangle \rightarrow \cos^{m-1}\theta_M(\cos\theta_M|100\rangle + \sin\theta_M|010\rangle) \stackrel{m=M}{\rightarrow} |100\rangle \quad (5)$$

It is clear that after M big cycles and N small cycles detector $D_1$ clicks. A click at the detector $D_1$ ensures counterfactuality as any photon in the public channel would lead to a click at one of the detectors $D_3$ [see Eq. (2)]. The probability of click at $D_1$ is obtained by collecting all the contributions that are reflected from all the beam-splitters $BS_m$'s and is given by $P_1 = \cos^{2M}\theta_M$.

On the other hand, if the Receiver blocks throughout (logic 1), one would have (for the m-th cycle)

$$|010\rangle \rightarrow \cos^{n-1}\theta_N(\cos\theta_N|010\rangle + \sin\theta_N|001\rangle) \stackrel{n=N}{\rightarrow} |010\rangle \quad (6)$$

where it is assumed N>>1. After the m-th cycle, the photon state is $$|100\rangle \rightarrow \cos m\theta_N|100\rangle + \sin m\theta_M|010\rangle \stackrel{m=M}{\rightarrow} |010\rangle \quad (7)$$

Thus, after M big cycles and N small cycles, detector $D_2$ clicks. Again the counterfactuality is ensured by a click at $D_2$ as any photon in the public channel would be absorbed by the blocking device and would not be available for detection at $D_2$. The probability of click at the detector $D_2$ is given by $P_2 = |y_{\{M,0\}}|^2$ where $y_{\{M,0\}}$ can be obtained from the recursion relations $x_{m+1} = a_M x_m - b_M y_{\{m,N\}}$, $y_{\{m+1,0\}} = b_M x_m + a_M y_{\{m,N\}}$, $y_{\{m,n\}} = a_N y_{\{m,n-1\}} = a_N y_{\{m,n-1\}} - b_N z_{\{m,n-1\}}$ and $z_{\{m,n\}} = c(b_N y_{\{m,n-1\}} + a_N z_{\{m,n-1\}})$ where $a_{N(M)} = \cos\theta_{N(M)}$, $b_{N(M)} = \sin\theta_{N(M)}$, and c=0 with $x_1 = a_M$, $y_{\{1,0\}} = b_M$ and $z_{\{m,0\}} = 0$. Obviously, if c=1, one can get the probability $D_1$ clicking ($P_1 = |x_M|^2$) for the case the Sender encoding "0".

Figure 4:
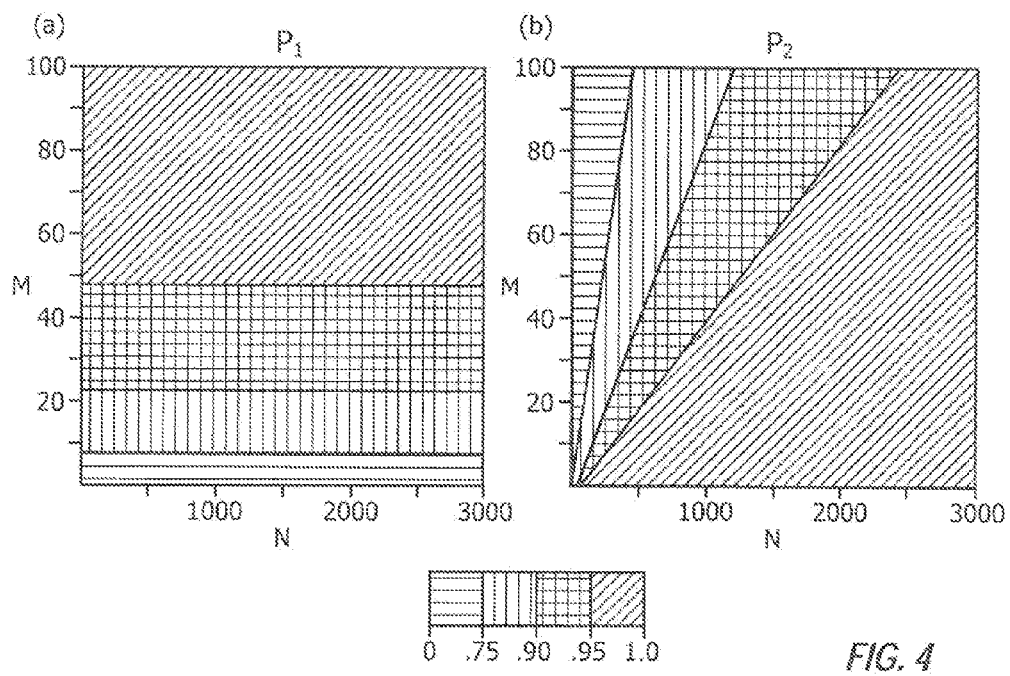
FIGS. 4a and 4b are probability plots for detector activation versus number of cycles.

In FIGS. 4$a$ and 4$b$ the probabilities $P_1$ and $P_2$ (which are the probabilities of $D_1$ and $D_2$ clicking, respectively) are plotted using the above recursion relations. $P_1$ and $P_2$ are plotted against different number of cycles M and N for the Sender unblocking the Receiver's photon (FIG. 4$a$) and the Sender obstructing the Receiver's photon (FIG. 4$b$). It may clearly be seen that $P_1$ is above 0.90 for M>25 and is independent of N. However, a value of $P_2$ above 0.90 requires not only M>25 but a much larger value of N. Numerical estimates indicate ($P_1$=0.906, $P_2$=0.912) for (M=25, N=320); ($P_1$=0.952, $P_2$=0.953) for (M=50, N=1250); and ($P_1$=0.984, $P_2$=0.982) for (M=150, N=10000). This shows that a perfect counterfactuality is possible, albeit for large values of M and N. This may be complicated for the Mach-Zehnder setup described so far. However a Michelson interferometer-based implementation offers significant practical advantages. Thus, after elucidating the essential features of this direct counterfactual quantum communication protocol, we revert to a discussion of the Michelson-type configuration shown in FIG. 2. This allows a better practical realization of the protocol, with a massive saving of resources.

Here, the function of BS is replaced by the combination of PBS and SPR. Assume the state of an H photon is $|H\rangle$, and the state of a V photon is $|V\rangle$. Then, each time the photon passes through one SPR, the polarization evolves as follows $|H\rangle \rightarrow \cos/\beta_i|H\rangle + \sin \beta_i|V\rangle$ and $|V\rangle \rightarrow \cos \beta_i|V\rangle - \sin \beta_i|H\rangle$, where $\beta$ represents the rotation angle with the subscript i=1,2 corresponding to different SPRs. The mirror $SM_{1(2)}$ is switched off initially to allow the photon to be transmitted but it remains on during M(N) cycles and is turned off again after M(N) cycles are completed. The initial photon emitted by the light source is $|H\rangle$. Since the signal photon passes through SMs twice each cycle, one may set $\beta_{1(2)}=\pi 4M(N)$. It is not difficult to see that, if the Sender blocks the photon, detector $D_2$ clicks. Also, if the Sender passes the photon, detector $D_1$ clicks.

Figure 5:
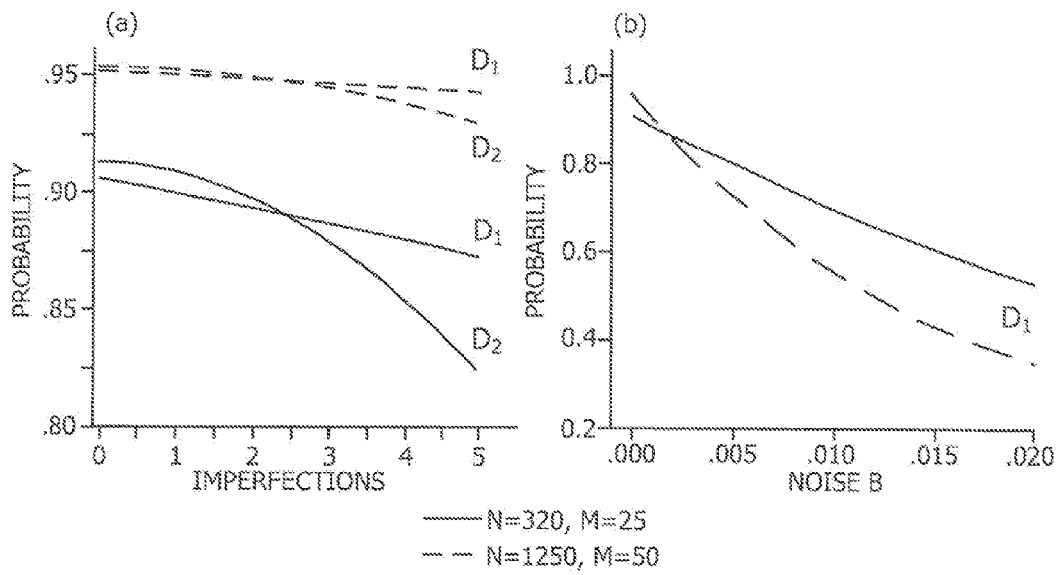
FIG. 5a is a probability plot of detector activation versus imperfections of the switchable polarization rotators.
FIG. 5b is a probability plot of detector activation versus system noise (defined by the blocking rate of each cycle by any object other than the intended Receiver).

Next, the effect of the imperfections of the system and the noise in the transmission channel on the performance of the counterfactual communication are considered. There are two kinds of imperfections. The first one only affects the efficiency of the communication, but does not cause the measurement errors. The imperfection coming from the sensitivity of the detectors $D_1$, $D_2$ and $D_3$ is an example of this imperfection. If the sensitivity of these detectors is $\eta$, then the efficiency of the communication also reduces to $\eta$. However, the second kind of imperfection, which mainly comes from the switchable polarization rotators (SPRs), results in the measurement errors. During each cycle, SPRs should rotate the signal photon with a certain angle, but in practical situations there can be a slight error in the angle. It may be supposed that the error for the SPR in the inner cycle is $\Delta\theta_N=s_N(\theta_N/N)$, namely, the photon state is rotated with an additional angle $s_N\theta_N$ after N cycles. The corresponding coefficient for the error of the SPR in the outer cycle is $s_M$. Their influence may be estimated numerically by replacing $\theta_{N(M)}$ with $\theta_{N(M)}+\Delta\theta_{n(M)}$ for fixed N and M in the recursion relations given above. FIG. 5a is a plot of the detector $D_1$ and $D_2$ clicking rates for different values of s describing the imperfection of the switchable polarization rotators (setting $s=s_N=s_M$). The red lines are plotted for the case M=50, N=1250. The black lines are plotted for the case M=25, N=320. It is clear that the performance is still good if the factor s is less than two.

Another source of noise results when the photon in the transmission channel is blocked by some object other than Message Sender's. The noise rate may be defined as B. This represents the signal being blocked in each cycle by any object other than Message Sender's. It is easy to see if the Sender chooses to block his path, the result at the Receiver's end does not change. For the case when the Sender allows the photon component to be reflected, the result does not change appreciably if there is blocking only in one cycle. However, the noise may cause a problem if the blocking takes place in multiple cycles. FIG. 5b is a plot of the probability of $D_1$ clicking (the Sender passing the photon) with different noise B defined by the blocking rate of each cycle by any object except the Sender. The red lines are plotted for the case M=50, N=1250. The black lines are plotted for the case M=25, N=320. To simulate the noise, random numbers between 0 to 1 may be created each time the photon component passes through the transmission channel. If the number is less than B, the signal photon may be regarded as being blocked out of the communication system (Set c=0 for that cycle, otherwise c=1). The figure shows that the blocking rate B should be suppressed under 0.2%.

It should be noted that the time control of switchable mirrors (SMs) is also very important. Suppose the distance between the Sender and the Receiver is L. The control time of these switchable mirrors should be less than 2 L/$c_0$ ($c_0$ being the light speed).

The emphasis here is on the counterfactual nature of direct communication that brings about the essential difference between classical and quantum communication. The secure issue is important but also very complicated. Here for simplicity, some possible attacks by an eavesdropper ("Eve" in the drawing figures) and how to overcome them are discussed.

The first is an intercept-resend attack whereby for the case where the Sender blocks the quantum channel the Eavesdropper unblocks the channel by replacing the Sender's setup, ideally at the last outer cycles. The Eavesdropper then measures and resends upon detection. However, provided the number of cycles N and M are kept secret by the Receiver, it can be proved that the Eavesdropper cannot, on average, intercept the Receiver's photons and resend them without being detected herself. It is not difficult to see, without the knowledge of N and M, the random replacement for the Sender's setup will decrease the probability the Eavesdropper catching the Receiver's test photon. Meanwhile, the chance $D_3$ clicking will increase anomalously.

The second attack by the Eavesdropper involves using a similar counterfactual setup (avoiding clicking $D_4$) to read out the Sender's information. Since the Sender cannot distinguish the source of the photon, the Eavesdropper can attack the Sender's setup almost whenever she wants to. This attack can be avoided by means of the time delay setup shown in FIG. 2. The red dashed line is a classical channel used by the Receiver to control an optical gate positioned before the Sender's setup. The component of the Receiver's photon (with almost zero probability amplitude) can pass through it only if the gate is open. A long optical delay ($OD_3$) is added into the transmission path before the gate. It takes time T for the photon component to go through $OD_3$, which means that the signal in the classical channel is always faster than that in the quantum channel with a time difference $\tau$. If the Receiver needs the gate opened in order to pass her photon component, the control signal in the classical channel should be delayed by time $\tau$. Suppose that it takes time T for the photon component to pass through the quantum channel. The transmission time from the Eavesdropper to the Sender is T' (assuming the Eavesdropper knows exactly the distance between her and the Sender). The opening time for the gate will depend on how much time the photon spends in the Receiver's setup, plus instrument error. Its maximum value is designated as $\Delta t$. Now, the Eavesdropper has to utilize this time $\Delta t$. Since she does not know when the Receiver will send her photon component in, the Eavesdropper needs to measure the control signals in the classical channel in order to get gate information. Suppose the Eavesdropper can catch the control signal and resend it straight on. She immediately starts her counterfactual attack on the Sender. It takes T'+$\tau$ time for her photon component to reach the gate. However, the gate opening time is from T' to T'+$\Delta\tau$. Thus if $\tau \gg \Delta t$, it is impossible for the Eavesdropper's photon to get into the Sender's setup. For the next gate opening time (the next photon cycle), the Receiver can still change the optical distance in her setup. This means the Eavesdropper cannot know the correct gate opening time.

There are two more important issues to be addressed. That is to see what happens when the Eavesdropper sends a fake control photon into the public channel, or continuously attacks the gate counterfactually (avoiding clicking $D_4$). In the former case, the Sender and the Receiver expose this kind of attack simply by publicizing their photons' departure and arrival times. For the latter case, since counterfactual attack needs the Eavesdropper's test photon bouncing between the Eavesdropper and the Sender a sufficiently large number of times, if the gate opening time can be made random and controlled by the Receiver, the Eavesdropper's test photon may pass through the gate for one time, but it is impossible for it passing through in each following cycles. Thus, it would not be possible for the Eavesdropper to avoid her photon being blocked by the gate.

Two kinds of attacks by the Eavesdropper have been discussed. Both can be defended successfully by (1) adding a gate at the Sender's end that is controlled by the Receiver, (2) by choosing N or M randomly by the Receiver before the communication (during the communication these numbers could be fixed), and (3) by controlling the optical path length of each cycle by the Receiver. Of course these features take away from the simplicity and the beauty of the invention but they may be required if one insists on security.

Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:

1. An apparatus for direct counterfactual quantum communication comprising:
    (a) a photon source emitting photons in a first state;
    (b) means for transmitting a photon in a first state to a first beam splitter;
    (c) a first beam splitter configured to randomly cause the photon to take either a first path or a second path;
    (d) a second beam splitter configured to randomly split a photon on the second path into a third path and a fourth path;
    (e) means for selectively blocking a photon on the fourth path;
    (f) a third beam splitter configured to combine photons on the third path with unblocked photons on the fourth path and pass photons into a fifth path and a sixth path such that, if constructive interference occurs, the probability of finding a photon on the sixth path is greater that if constructive interference does not occur;
    (g) means for blocking photons on the sixth path if photons were blocked on the fourth path;
    (h) a fourth beam splitter configured to combine photons on the fifth path with unblocked photons on the sixth path and pass photons into a seventh path and an eighth path such that, if constructive interference occurs, the probability of finding a photon in the eighth path is greater than finding a photon in the sixth path and if no constructive interference occurs the probability of finding a photon in the eighth path is approximately equal to the probability of finding a photon in the sixth path;
    (i) means for blocking photons on the eighth path if photons were blocked on the fourth path;
    (j) a fifth beam splitter configured to combine photons on the seventh path with unblocked photons on the eighth path and pass into a ninth path and a tenth path such that, if constructive interference occurs, the probability of finding a photon in the tenth path is equal to the probability finding a photon in the second path;
    (k) means for detecting any photons on the tenth path;
    (l) a sixth beam splitter configured to combine photons on the ninth path with photons on the first path and pass photons into an eleventh path and a twelfth path such that, if constructive interference occurs, the probability of finding a photon in the twelfth path is greater than the probability of finding a photon in the twelfth path if constructive interference does not occur;
    (m) at least one additional iteration of elements (b) through (l), above, configured to combine any photons on the eleventh path with unblocked photons on the thirteenth path in a seventh beam splitter that passes photons into a fourteenth path and a fifteenth path;
    (n) means for detecting any photons on the fourteenth path;
    (o) means for detecting any photons on the fifteenth path; and,
    (p) a time delay system that comprises an optical gate controlled by a signal transmitted in a classical channel and an optical delay.

2. An apparatus as recited in claim 1 wherein at least one of the beam splitters has a reflectivity greater than 50%.

3. An apparatus as recited in claim 1 wherein at least one of the beam splitters has a reflectivity greater than about 90%.

4. An apparatus as recited in claim 1 wherein at least one of the beam splitters has a reflectivity greater than about 95%.

5. An apparatus as recited in claim 1 wherein at least one of the beam splitters has a reflectivity greater than about 99%.

6. An apparatus as recited in claim 1 wherein the photon is polarized.

7. An apparatus as recited in claim 6 wherein the photon is horizontally polarized.

8. An apparatus as recited in claim 1 wherein the means for selectively blocking photons comprises a switchable mirror.

* * * * *

UNITED STATES PATENT AND TRADEMARK OFFICE
CERTIFICATE OF CORRECTION

PATENT NO.       : 8,891,767 B2   Page 1 of 1
APPLICATION NO.  : 13/723517
DATED            : November 18, 2014
INVENTOR(S)      : Zubairy et al.

It is certified that error appears in the above-identified patent and that said Letters Patent is hereby corrected as shown below:

On the title page item (73), the Assignee should be listed as:
Texas A&M University System, College Station, TX (US)
--King Abdulaziz City for Science and Technology, Riyadh (SA)--

Signed and Sealed this
Twenty-second Day of December, 2015

Michelle K. Lee
*Director of the United States Patent and Trademark Office*